UNITED STATES PATENT OFFICE.

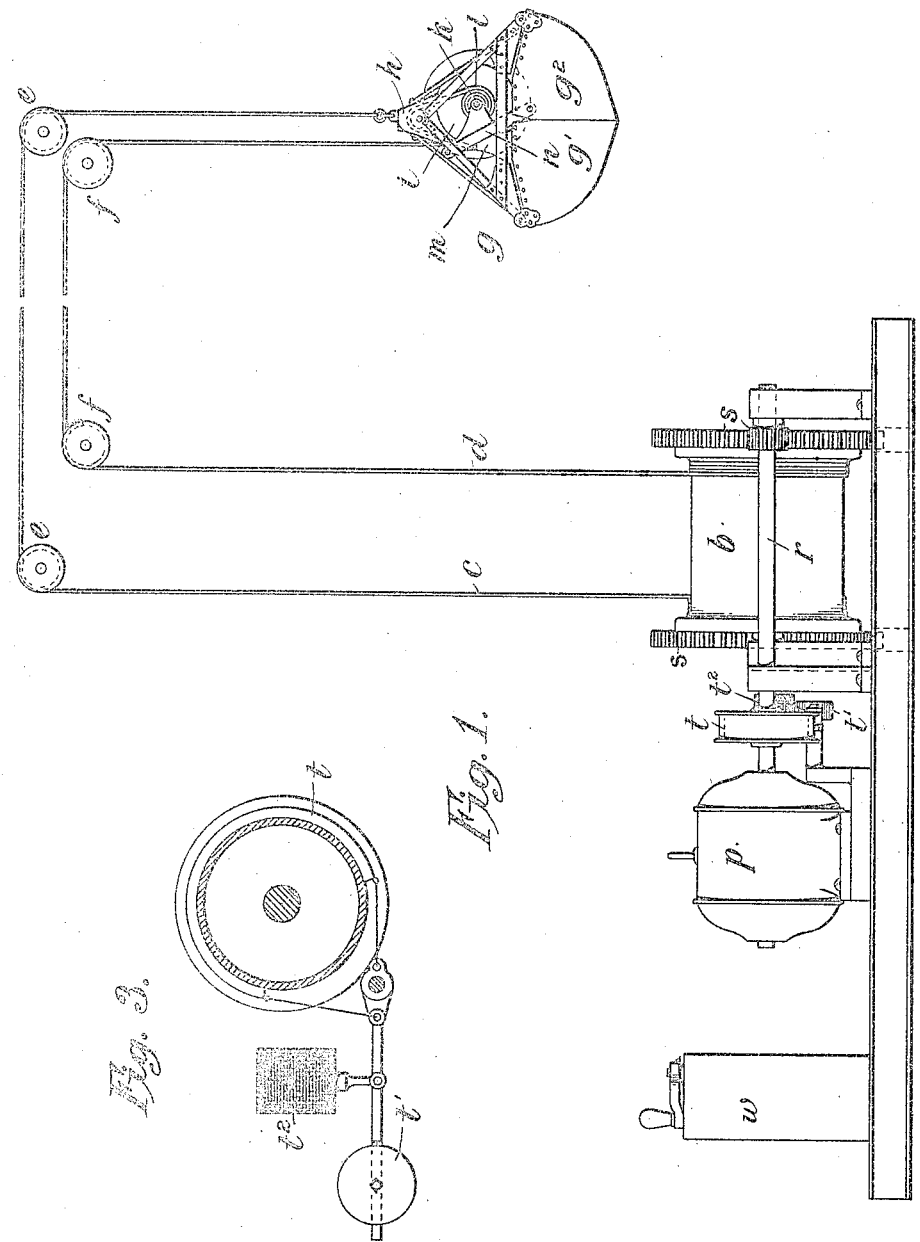

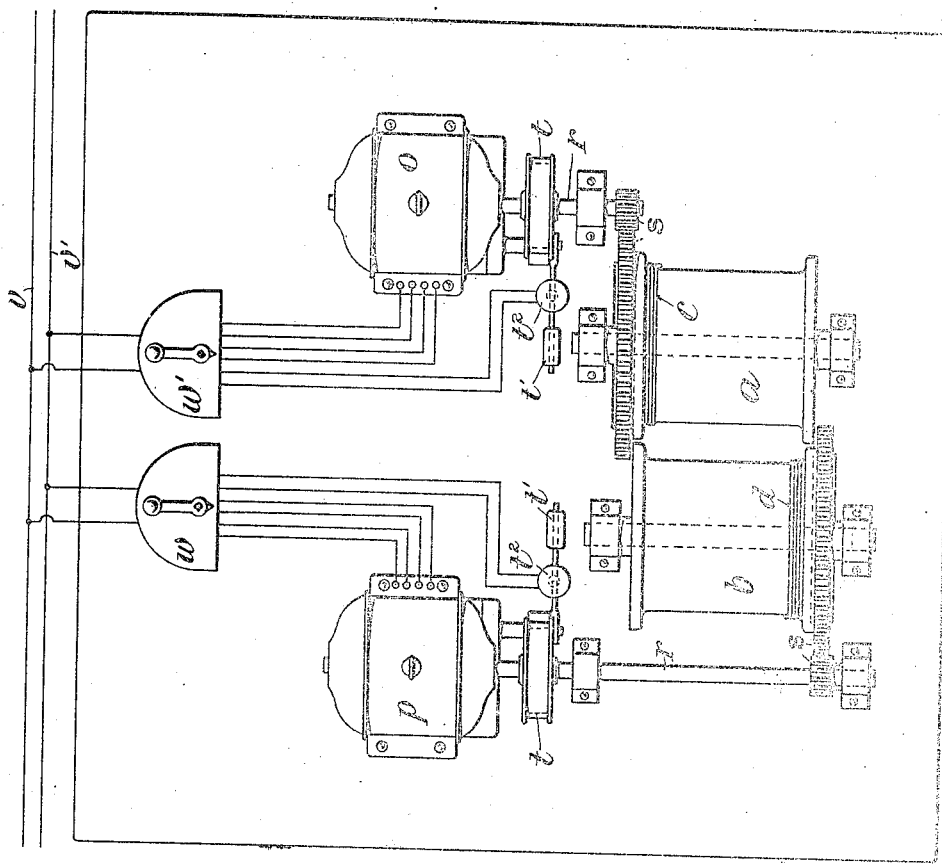

CHARLES WALLACE HUNT, OF NEW YORK, N. Y.

HOISTING APPARATUS.

No. 833,929.     Specification of Letters Patent.     Patented Oct. 23, 1906.

Application filed February 7, 1906. Serial No. 299,875.

*To all whom it may concern:*

Be it known that I, CHARLES WALLACE HUNT, a citizen of the United States, and a resident of West New Brighton, in the borough of Richmond, city of New York, in the State of New York, have invented certain new and useful Improvements in Hoisting Apparatus, of which the following is a specification, reference being had to the accompanying drawings, forming a part hereof.

In hoisting apparatus such as that which is commonly used for discharging coal and other like purposes, and comprises two hoisting-drums and ropes connected to the shovel or scoop, the coöperation of such drums and ropes being necessary to control the opening and closing of the shovel or scoop as well as to effect the raising and lowering, it is usual to provide clutches and brakes for both drums for the purpose of enabling the winding in and paying out of one or both ropes to be regulated according to the operation to be performed, it being necessary when lowering the load and when opening or closing the shovel to disconnect one or the other, or both, of the drums from the driving mechanism and to control the backward rotation by brakes. The mechanism usually employed for the purpose requires the operation by the attendant of three or more foot or hand levers, and therefore places an excessive tax upon the powers of the operator.

It is the object of this invention to combine with the drums and ropes and the shovel or scoop to be raised or lowered and opened or closed thereby means for operating and controlling the movement of the drums which shall require only two operating-handles for the attention of the operator, such means comprising two independent reversible motors separately connected to the respective drums and provided with electrically-controlled brakes and separate controllers therefor, whereby each drum at will can be driven ahead, can be relieved of the driving impulse, and can be subjected to a braking action proportionate to the requirements, and can receive a reverse driving impulse when necessary.

The invention will be more fully explained hereinafter with reference to the accompanying drawings, in which it is illustrated, and in which—

Figure 1 is a view in side elevation of a hoisting apparatus constructed and arranged in accordance with the invention. Fig. 2 is a partial plan view thereof somewhat diagrammatic in its nature, and Fig. 3 is a detail view of the brake applied to the motor.

In the embodiment of the invention represented in the drawings the two hoisting-drums $a$ and $b$, of ordinary construction and mounted for rotation, as usual, are respectively connected by ropes $c$ and $d$, which pass over suitably-placed guide-pulleys $e$ and $f$ with the scoop or shovel $g$, the rope $c$ being connected to the frame $h$ of the shovel, while the rope $d$ is connected to the drum $i$, the shaft $k$ of which is operatively connected, through a rope or chain $l$ and levers $m$ and $n$, with the two parts $g'$ and $g^2$ of the scoop to effect the opening and closing of the shovel or scoop in the usual manner. It will be understood that tension upon the rope or chain $d$ closes and holds closed the scoop or shovel and that when the tension is relaxed the scoop or shovel will open. In raising and in lowering the load it is therefore necessary to maintain relative tension upon the rope or chain $d$ as compared with the rope or chain $c$ or to relax the same, according to the operation to be accomplished—that is, whether the bucket is to be opened or closed. The lowering of the load is effected by gravity, and at such times the speed of descent of the load is controlled by a braking action upon one or both of the motors. When the load is to be discharged from the shovel, the rotation of the drum $a$ must be stopped and the drum $b$ must be free to rotate in order that the shovel may open, the drum $a$ being held by the braking action while the drum $b$ is released from the driving impulse. In closing the shovel the drum $b$ is first rotated to put tension on the rope or chain $d$, while the drum $a$ is released from the driving impulse in order that the rope or chain $c$ may be slack. In hoisting the load may be carried by the drum $b$ alone, the drum $a$ rotating to take up the slack of the rope or chain $c$, or the load may be carried by both drums. It is therefore necessary, as is well understood, to make each drum controllable independently of the other and to provide for rotating one drum slightly behind the other or both drums together and for applying a braking action to either drum independently of the other.

To accomplish the purposes just referred to, there are provided in accordance with this invention two independent reversible motors $o$ and $p$, each being connected independently of the other with the corresponding drum, as through a shaft $r$ and suitable gears $s$. To each motor is applied a brake $t$, preferably of the character indicated in Fig. 3 of the drawings, in which a weighted arm $t'$ operates normally to apply the brake, and the action of the weighted arm is opposed by a solenoid $t^2$, which is electrically connected with the motor and controller in the manner fully described in Letters Patent of the United States No. 786,323, dated April 4, 1905. Both motors may be driven from a common supply, (indicated by the line-wires $v$ $v'$;) but each motor with its brake is separately controlled by its own controller $w$ $w'$, which is arranged, as described in said Letters Patent No. 786,323, to drive the motor ahead or backward with varying current or to cut off current altogether and to regulate the action of the brake, according to the conditions under which the motor is operated. It will be understood that when the motor is reversed through the operation of the controller it then acts to overhaul the rope and that the brake operates to sustain the load or to permit the load to descend by gravity at the proper speed.

The operation of the improved hoisting apparatus will be readily understood without further explanation. It will be seen that by the manipulation of the two controller-handles it is possible for the operator to control the apparatus precisely as may be desirable under the given conditions, while there are no clutches or mechanical brakes to require his attention and to become possible sources of trouble.

I claim as my invention—

1. A hoisting apparatus comprising two independent hoisting-drums, an automatic shovel, connections from one of said drums to the frame of the shovel, connections from the other of said drums to the moving parts of the shovel to open and close the same, independent motors for said hoisting-drums respectively, independent electrically-controlled brakes for said motors respectively, and independent controllers for said motors and brakes respectively.

2. A hoisting apparatus comprising independent hoisting-drums, a shovel having a frame and movable members to open and close and means to operate said members, connections from one of said drums to the frame of the shovel, connections from the other of said drums to the operating means for the members of the shovel, independent motors for said drums respectively, independent electrically-controlled brakes for said motors respectively and independent controllers for said motors and brakes respectively.

This specification signed and witnessed this 5th day of January, 1906.

CHARLES WALLACE HUNT.

In presence of—
 CHARLES HUMPHREY,
 CHAS. E. SIMONSON.